(12) United States Patent
Fandrey (10) Patent No.: US 6,901,803 B2
(45) Date of Patent: Jun. 7, 2005

(54) PRESSURE MODULE

(75) Inventor: Mark C. Fandrey, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 11 days.

(21) Appl. No.: 10/677,209

(22) Filed: Oct. 2, 2003

(65) Prior Publication Data

US 2005/0072242 A1 Apr. 7, 2005

(51) Int. Cl.[7] .............................................. G01L 7/00
(52) U.S. Cl. ....................................................... 73/706
(58) Field of Search .......................... 73/706, 715–727, 73/756, 861.41–861.54

(56) References Cited

U.S. PATENT DOCUMENTS

| | | | |
|---|---|---|---|
| 4,230,187 A * | 10/1980 | Seto et al. .................. | 166/336 |
| 4,466,290 A | 8/1984 | Frick .......................... | 73/756 |
| 4,745,810 A * | 5/1988 | Pierce et al. ................. | 73/706 |
| 4,798,089 A | 1/1989 | Frick et al. .................. | 73/706 |
| 4,833,922 A | 5/1989 | Frick et al. .................. | 73/756 |
| 4,993,754 A | 2/1991 | Templin, Jr. ................. | 285/189 |
| 5,524,492 A | 6/1996 | Frick et al. .................. | 73/706 |
| 6,059,254 A | 5/2000 | Sundet et al. ................ | 248/678 |
| 6,079,276 A | 6/2000 | Frick et al. .................. | 73/718 |
| 6,272,931 B1 | 8/2001 | Nimberger .................... | 73/756 |
| 6,389,904 B1 | 5/2002 | Petrich et al. ................ | 73/756 |
| 6,473,711 B1 * | 10/2002 | Sittler et al. ................ | 702/138 |
| 6,487,912 B1 * | 12/2002 | Behm et al. ................. | 73/753 |
| 6,568,278 B2 | 5/2003 | Nelson et al. ................ | 73/756 |
| 2002/0178827 A1 | 12/2002 | Wang .......................... | 73/718 |

FOREIGN PATENT DOCUMENTS

| WO | WO 95/08759 | 3/1995 |
|---|---|---|
| WO | WO 98/30880 | 7/1998 |
| WO | WO 03/008921 | 7/2001 |

OTHER PUBLICATIONS

Fisher–Rosemount Comprehensive Product Catalog 00805-0100-0125, Jan. 1998, Pressure pp. 131-140 entitled "Absolute and Gage Pressure Transmitters".

* cited by examiner

Primary Examiner—William Oen
(74) Attorney, Agent, or Firm—Westman, Champlin & Kelly (57) ABSTRACT

A pressure module includes a sensor assembly with tubes extending from a pressure sensor to fluid isolator members. The pressure sensor is contained in a cavity in a module housing. The module housing includes support members joined by joints to the fluid isolator members to provide barriers to leakage of process fluids into the cavity. Threaded process inlets on a bottom outside surface of the module housing couple the process fluids to the fluid isolator members through process passageways in the module housing.

28 Claims, 12 Drawing Sheets

PRESSURE MODULE

BACKGROUND OF THE INVENTION

Coplanar pressure transmitters typically connect to a separate pressure flange or valve manifold in order to complete the connections to threaded pipes in a process fluid system. The use of the pressure flange or valve manifold increases cost, can degrade performance and adds leak points to the system.

Coplanar pressure transmitters have isolator diaphragms that are typically welded directly to a module housing that is connected to the pressure flange using mounting bolts. When the module housing body is subjected to mechanical stress from tightening mounting bolts, the mechanical stress can deform the module housing and isolator diaphragms, resulting in measurement errors.

A method and apparatus are needed to enhance the capabilities of coplanar pressure transmitters. Embodiments of the present invention provide such enhancements, and offer other advantages over the prior art.

SUMMARY OF THE INVENTION

Disclosed is a pressure module that comprises a sensor assembly. The sensor assembly includes a pressure sensor, fluid isolator members and tubes. The tubes extend from the pressure sensor to the fluid isolator members.

The pressure module also comprises a module housing. The module housing forms a cavity in which the pressure sensor is contained. The module housing includes support members joined to the fluid isolator members to provide barriers to leakage of process fluids into the cavity.

The pressure module also comprises threaded process inlets arranged on a bottom outside surface of the module housing. The threaded process inlets couple the process fluids to the fluid isolator members through process passageways in the module housing.

Other features and benefits that characterize embodiments of the present invention will be apparent upon reading the following detailed description and review of the associated drawings.

DETAILED DESCRIPTION OF THE PREFERRED EMBODIMENTS

In the embodiments illustrated in FIGS. 5–13, isolator diaphragms are included in fluid isolator members that are separate from a module housing. The fluid isolator members are joined by joints to the module housing in a manner that isolates the isolator diaphragms from stresses (flanging effects) in the module housing developed by tightening the mounting bolts or threaded connections. The joints are preferably welded to provide a leakproof seal. The terms "weld joint" and "weld," as used in this application, refer to joining metal or ceramic parts by heating a joint between the parts so that the parts are united to form a fluid-tight seal that does not rely on mechanical compression seals. Welding includes various known methods of joining parts by heating. Welding includes, for example, joining with or without a filler material and includes laser, electric and gas welding as well as soldering with soft solders or brazing materials.

The arrangement includes inlets threaded directly in a module housing and removes the need for a separate pressure flange or valve manifold, thereby improving safety and reliability through the elimination of mechanical compression seals that are subject to chemical attack and leakage.

In a preferred arrangement, the pressure module retains the same bolt and planar process inlet pattern of existing transmitters so that the arrangement is backwards-compatible with existing process fluid installations, if needed. The design substantially reduces weight and cost by eliminating the pressure flange and simplifying machining operations. Additional cost savings are realized through the simplification of machining operations and materials that are used to produce the fluid isolator members and module housing. Use of the fluid isolator member preferably allows for machining of the isolator convolution pattern around a centerline common with the isolator support block. The support block and module housing designs enable both parts to be machined from industry standard bar stock. The reduced size and simplified geometry of the isolator block also permit this part to be formed of ceramic material. In some high temperature applications, ceramic is a preferred material because it is thermally insulating and can limit heat flow from the process fluids to the sensor 204, improving performance of the sensor 204.

Figure 1:
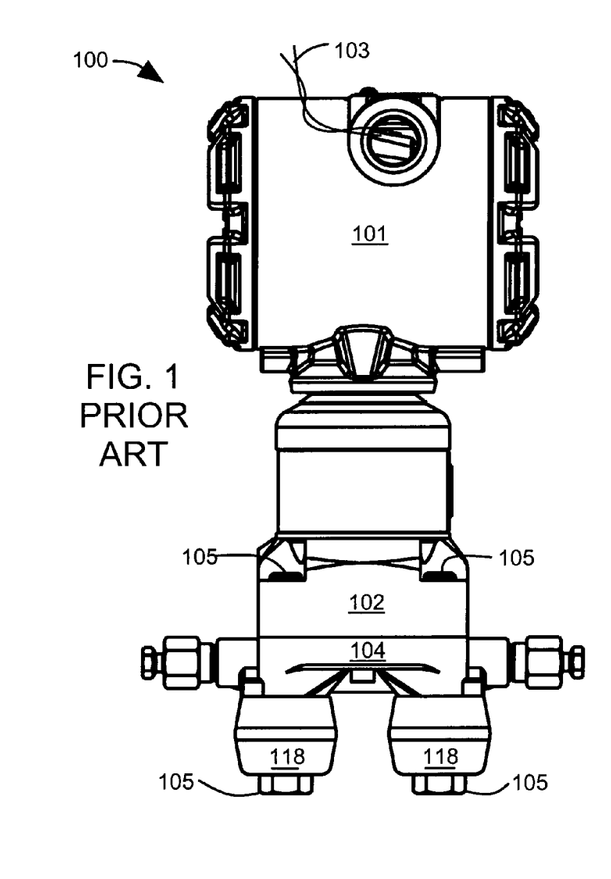
FIGS. 1–2 illustrate front and side views of an exemplary PRIOR ART pressure transmitter.
Figure 2:
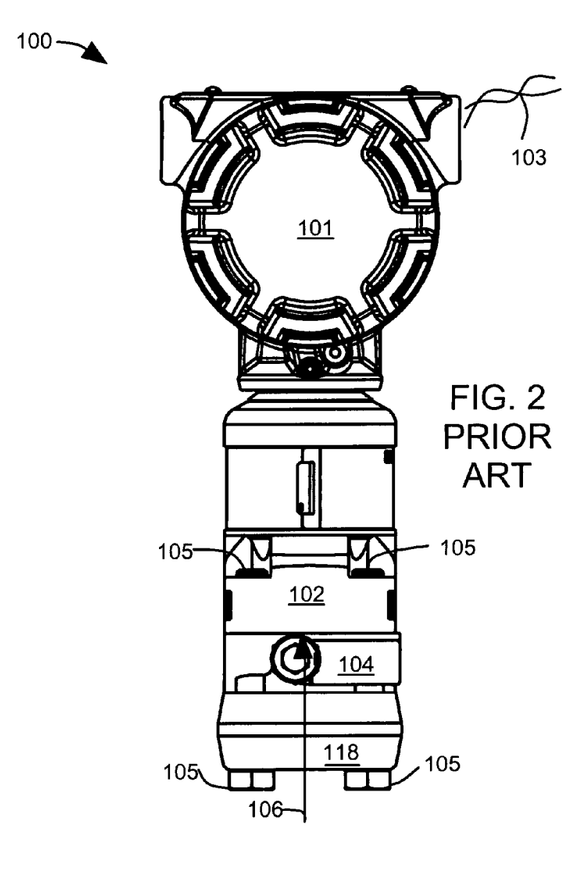

FIGS. 1–2 illustrate front and side views of an exemplary PRIOR ART pressure transmitter 100. Pressure transmitter 100 includes an electronics housing 101 that encloses electronic circuitry and a module housing 102 that houses isolator diaphragms, a pressure sensor and associated sensor circuitry. The module housing 102 is bolted to a pressure flange 104 by bolts 105. The bolts 105 also pass through flange adapter unions 118. The flange adapter unions 118 have threaded inlets which are connectable to threaded process pipes (not illustrated). Pressure flange 104 provides one or more process fluid pressures 106 to the transmitter 100 for pressure measurement. Pressure transmitter 100 is connected to a process loop 103 that energizes the pressure transmitter 100 and provides bidirectional communication for use in a process control system. The connection of the module housing 102 to the pressure flange 104 and bolts 105 is described in more detail below in connection with FIG. 3.

Figure 3:
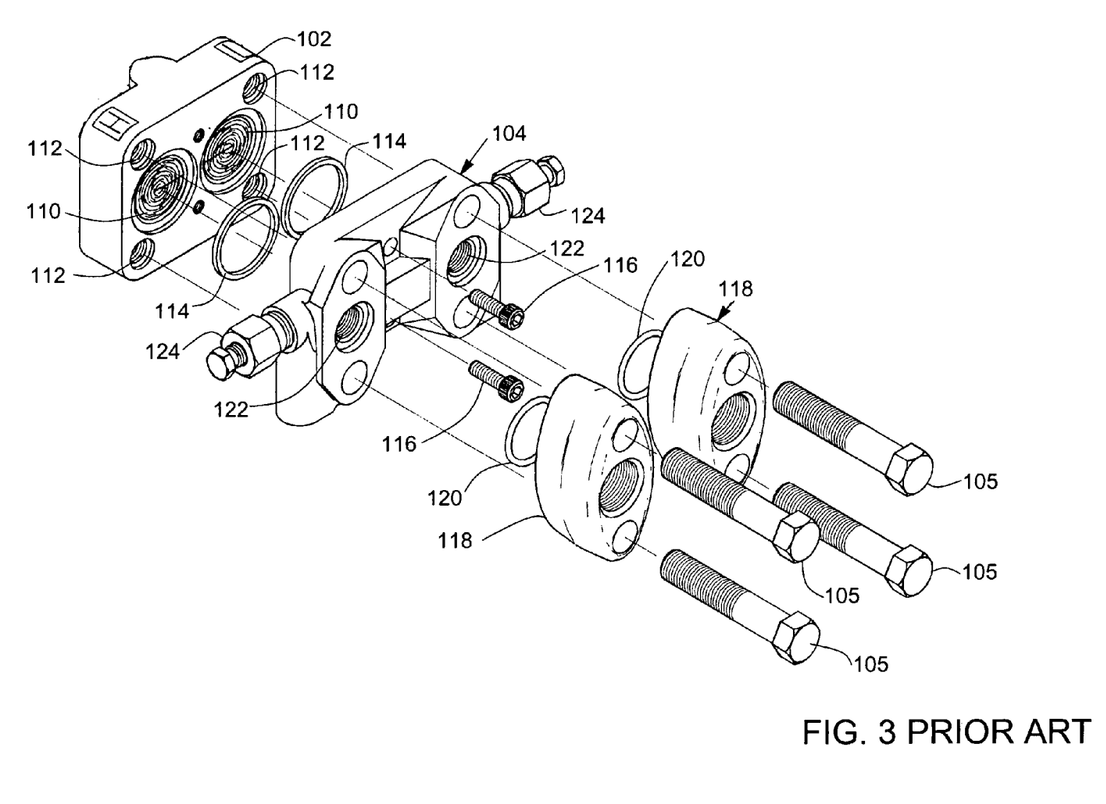
FIG. 3 PRIOR ART illustrates an exploded view of a portion of a module housing, pressure flange and bolts shown in FIGS. 1–2.

FIG. 3 PRIOR ART illustrates an exploded view of a lower portion of the module housing 102, the pressure flange 104, the flange adapter unions 118 and the bolts 105 shown in FIGS. 1–2.

The module housing 102 includes isolator diaphragms 110 that are welded directly to the module housing 102. The module housing 102 also includes threaded bolt holes 112 in a standard pattern around the isolator diaphragms 110. Gaskets 114 are mechanical compression seals that seal the pressure flange 104 to the module housing 102 around the isolator diaphragms 110. Screws 116 temporarily hold the pressure flange 104 and gaskets 114 in place during shipment and prior to making field process connections. The pressure flange 104 is fitted with drain/vent valves 124.

Flange adapter unions 118 are threaded onto process fluid piping (not illustrated) and then are sealed to pressure flange 104 by gaskets 120. Gaskets 120 are mechanical compression type seals. As an alternative to using the flange adapter unions 118, process pipes can be threaded directly into threaded holes 122 in the pressure flange 104. The bolts 105 pass through the flange adapter unions 118 (when used), the pressure flange 104, and are threaded into threaded bolt holes 112. When the bolts 105 are tightened, the gaskets 114 and 120 are compressed to provide mechanical compression seals for the containment of process fluid. The gaskets 114, 120 provide mechanical compression seals that are a potential leakage point for process fluid. In the embodiments illustrated below, an arrangement is illustrated that improves safety and reliability by reducing the potential for leakage presented by the use of mechanical compression sealing by gaskets 114, 120. In the embodiments illustrated below, process piping can be directly threaded into threaded process inlets on a module housing, eliminating the need for gaskets 114, 120.

Figure 4:
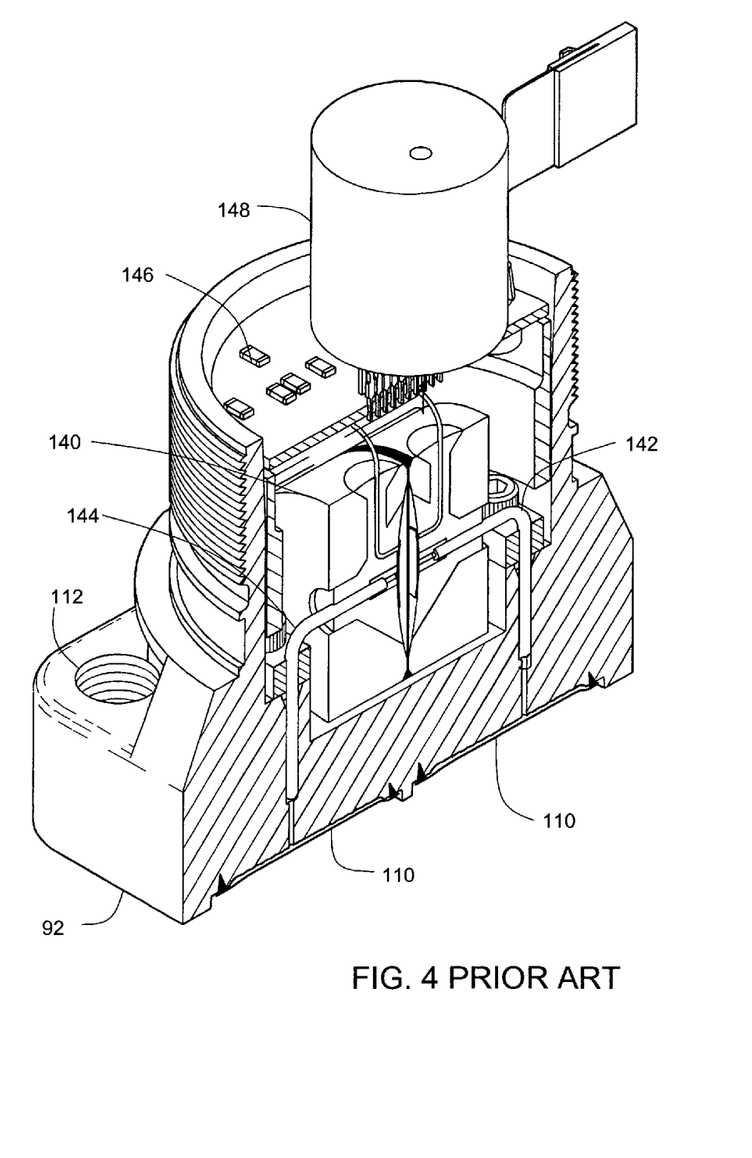
FIG. 4 PRIOR ART illustrates an oblique sectional view of a module housing.

FIG. 4 PRIOR ART illustrates an oblique sectional view of a module housing 92. A pressure sensor 140 located inside the module housing 92 connects by tubes 142, 144 to the isolator diaphragms 110. The isolator diaphragms 110 are welded directly to the module housing 92. A circuit board 146 provides circuitry associated with processing electrical signals from the sensor 142. A flat cable reel 148 houses a flat cable that provides electrical connections from the circuit board 146 to circuitry in an electronics housing (such as housing 101 shown in FIGS. 1–2). When bolts (such as bolts 105 shown in FIGS. 1–3) are tightened in the threaded bolt holes 112, the module housing 102 may deform as a process flange (such as process flange 104 shown in FIG. 1) and gaskets (such as gaskets 114 shown in FIG. 2) are drawn up tightly against the module housing 92. The potential deformation of the module housing 92 may distort the isolator diaphragms 110, resulting in measurement errors.

In the embodiments illustrated below, however, isolator diaphragms are included in fluid isolator members that are separate from a module housing. This isolation prevents the transmission of undesirable mechanical stresses to the isolator diaphragms. Also, in the embodiments illustrated below, process pipes can be threaded directly into the module housing, eliminating the need for a process flange, gaskets and bolting.

Figure 5:
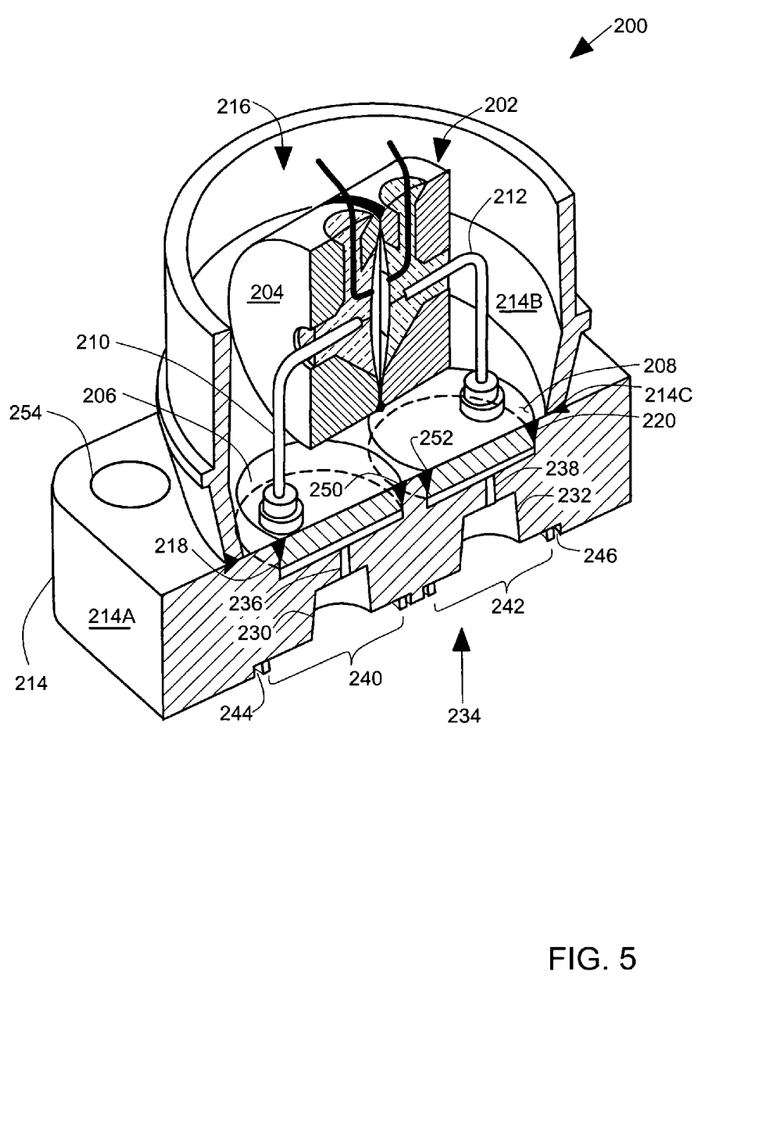
FIG. 5 illustrates an oblique sectional view of a first embodiment of a pressure module.

FIG. 5 illustrates an oblique sectional view of a first embodiment of a pressure module 200.

The pressure module 200 includes a sensor assembly 202. The sensor assembly 202 comprises a pressure sensor 204, fluid isolator members 206, 208 and tubes 210, 212 extending from the pressure sensor 204 to the fluid isolator members 206, 208. A module housing 214 forms a cavity 216 in which the pressure sensor 204 is contained. The module housing 214 includes supporting members or socket walls 218, 220 supporting the fluid isolator members 206, 208 while providing mechanical stress isolation between the module housing 214 and the fluid isolator members 206, 208. The arrangement of the fluid isolator members 206, 208 and the walls 218, 220 is described in more detail below in connection with examples illustrated in FIGS. 7–8. In a preferred arrangement, the module housing 214 comprises a base 214A that is machined from standard rectangular bar stock, and a threaded hub 214B that is machined from standard cylindrical pipe stock. The base 214A and the hub 214B are welded together at cylindrical weld joint 214C.

Threaded process inlets 230, 232 are arranged on a bottom outside surface 234 of the module housing 214. The threaded process inlets 230, 232 couple process fluids to the fluid isolator members 206, 208 through process passageways 236, 238 in the module housing 214. The threaded process inlets 230, 232 are preferably threaded with tapered pipe threads which can be used with a variety of commercially available PTFE sealants (such as Teflon™ sealants) to provide high reliability seals to process piping with tapered threads.

In an alternative embodiment, planar process inlets 240, 242 comprise cylindrical recesses surrounding each of the threaded process inlets 230, 232. Gasket sealing surfaces 244, 246 surround each of the planar process inlets 240, 242. These planar process inlets 240, 242 and the gasket sealing surfaces 244, 246 permit the module housing 214 to be backward-compatible in terms of an ability to connect to older style connection systems such as the system illustrated in FIG. 3. The sealing surfaces 244, 246 typically comprise grooves, however, the sealing surfaces 244, 246 can be flat in applications where a groove is provided on a mating surface of a pressure flange.

In this embodiment, joints 250, 252, which are preferably weld joints, join the fluid isolator members 206, 208 to the support members 218, 220 such that the joints 250, 252 form barriers to leakage of process fluid into the cavity 216. The joints 250, 252 are preferably laser weld joints in a continuous circle around each of the fluid isolator members 206, 208. The process passageways 236, 238 are free of mechanical compression fluid seals such as gaskets. There is a direct connection through the solid module housing 214 from the threaded process inlets 230, 232 to the fluid isolator members 206, 208. The only seals encountered in the module housing by the process fluid are the joints 250, 252, which are highly reliable and leakproof and do not rely on compression seals. It is appreciated that the isolator members may be coupled to a module housing in a various different configurations to form a hermetic seal. For example the isolator member may be made from a ceramic material and brazed to the housing.

One of four threaded bolt holes 254 is illustrated in the embodiment shown in FIG. 5. The bolt holes 254 are not used when the transmitter is installed using the threaded process inlets 230, 232. The bolt holes 254 are available, however, in a preferred arrangement for making a backward compatible installation using the older connection system illustrated in FIG. 3.

Figure 6:
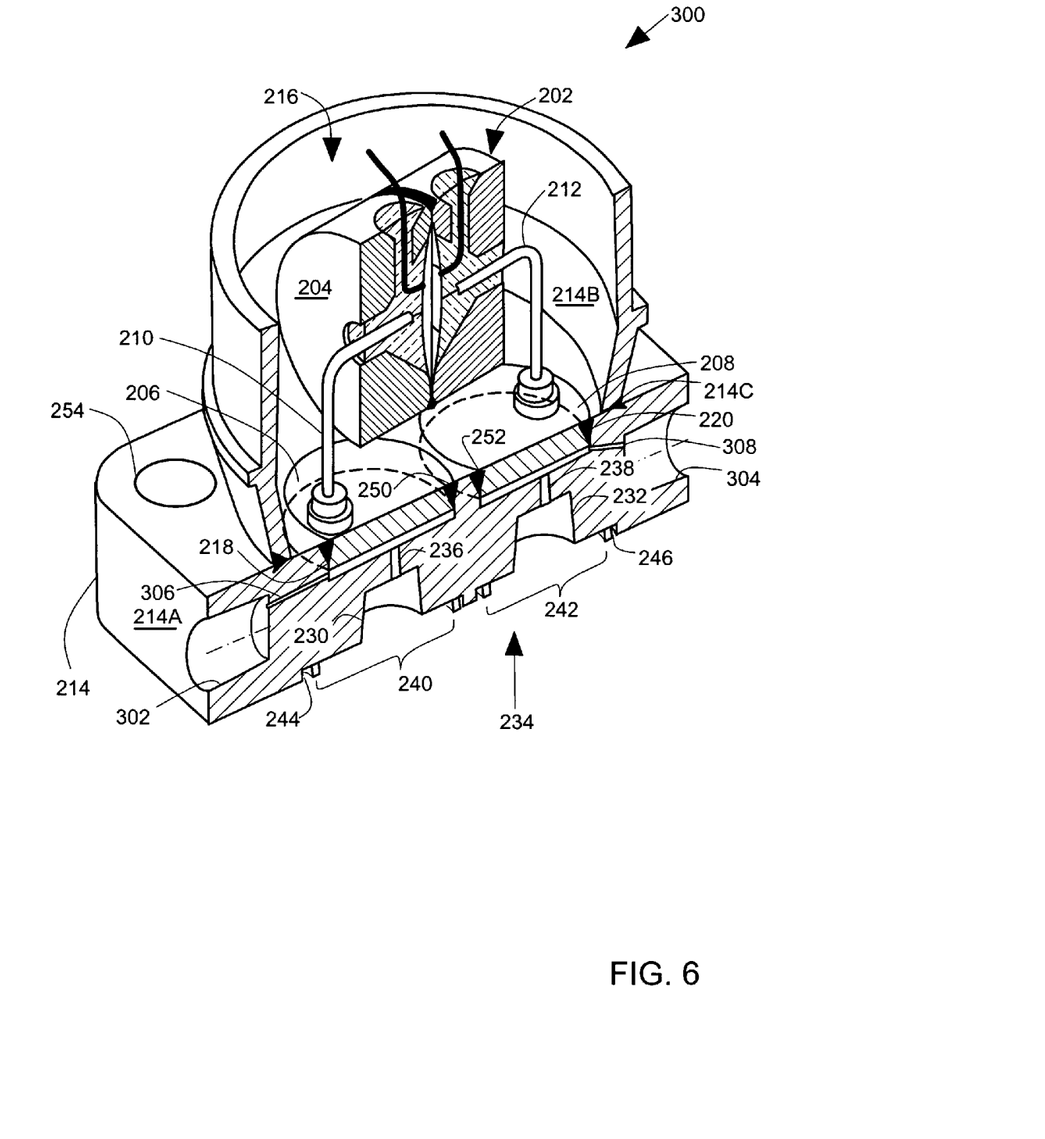
FIG. 6 illustrates an oblique sectional view of a second embodiment of a pressure module.

FIG. 6 illustrates an oblique sectional view of an embodiment of a pressure module 300. The pressure module 300 is similar to the pressure module 200 in FIG. 5, and reference numbers used in FIG. 6 that are the same as reference numbers used in FIG. 5 identify the same or similar features. The pressure module comprises threaded drain/vent inlets 302, 304 and drain/vent passageways 306, 308 extending between the support members walls 218, 220 (or alternatively another part of the sockets in which the fluid isolator members 206, 208 are supported) and the drain/vent valve inlets 302, 304. Drain/vent valves (such as drain/vent valves 124 shown in FIG. 3) are screwed into drain/vent inlets 302, 304. During the commissioning of pressure module 300 in a process fluid installation, the drain/vent valves can be temporarily opened with a wrench to bleed off undesired liquid in a process gas, or to drain off undesired gas in a process liquid so that the undesired gas or liquid does not interfere with the operation of the pressure module 300. In other respects the pressure module 300 is similar to the pressure module 200.

Figure 7:
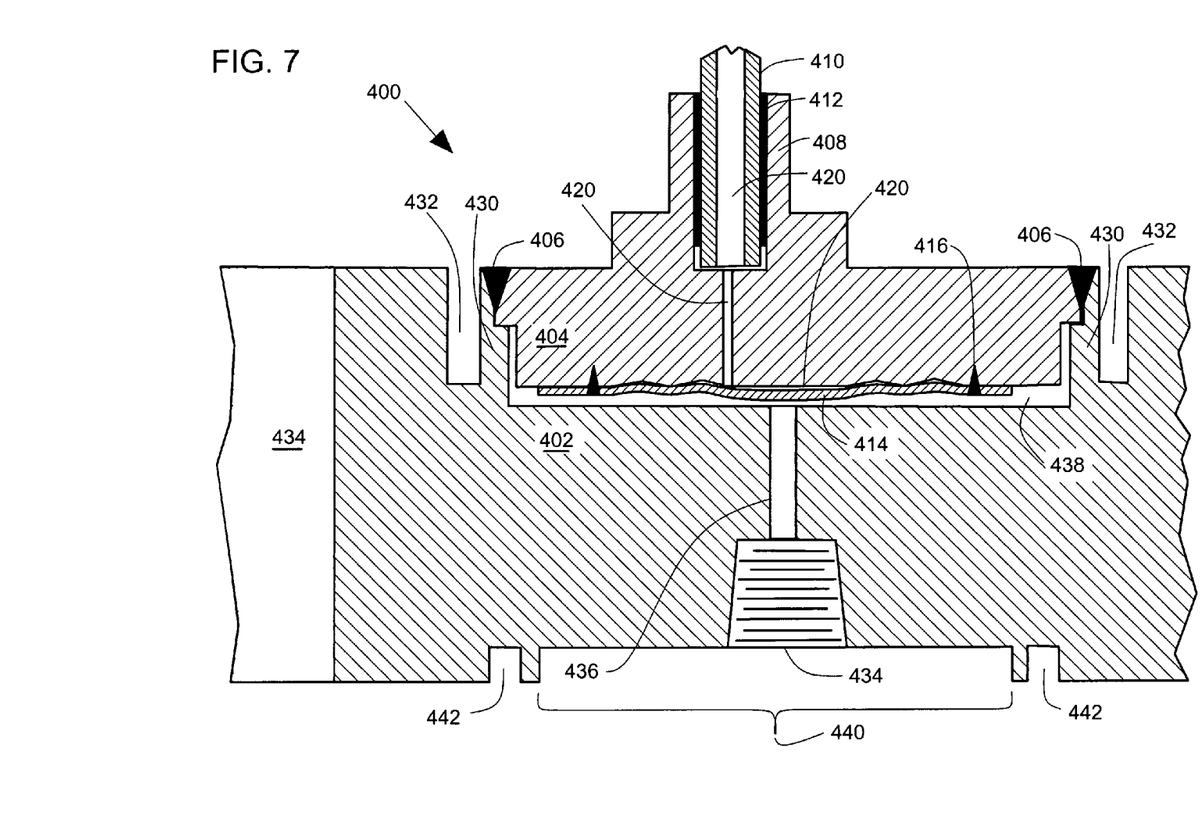
FIG. 7 illustrates an enlarged cross-sectional view of a first exemplary embodiment of a fluid isolator member and module housing.

FIG. 7 illustrates an enlarged cross-sectional view of a first embodiment of a fluid isolator member 400 in a module housing 402.

The module housing 402 includes a support member in the form of a cylindrical socket wall 430 that is shaped as an isolated support rim to provide mechanical stress isolation between the threaded mounting holes 434 (only one of which is visible in FIG. 7) and the fluid isolator member 400. A cylindrical sealing surface 432 is cut around the socket wall 430 to separate the socket wall from the main body of the module housing 402. The socket wall 430 is tall and thin and flexes easily. The flexing of socket wall 430 prevents transmission of mechanical stress from the main body of module housing 402 to the fluid isolator member 400. The fluid isolator member 400 is largely free of mechanical stress from its sealed mounting.

A threaded process inlet 434 can be connected directly to a threaded process pipe (not illustrated in FIG. 7) in order to convey process pressure along process fluid passageway 436 to an isolator diaphragm 414 for pressure sensing by the pressure sensor. A process fluid chamber 438 is formed around the isolator diaphragm 414 to allow space for the isolator diaphragm 414 to deflect with pressure and temperature changes.

The fluid isolator member 400 comprises an isolator support block 404 joined by a joint 406, which is preferably a weld joint, to a portion of the module housing 402 that comprises a support member. The isolator support block 404 includes a support block inlet 408 that couples to a tube 410. The tube 410 is one of two tubes that couples to a pressure sensor (not illustrated in FIG. 7). The tube 410 is preferably sealed to the support block inlet 408 by a braze joint 412.

An isolator diaphragm 414 is preferably joined by a peripheral weld joint 416 to the isolator support block 404.

Isolator fluid 420 fills a space between the isolator diaphragm 414 and the isolator support block 404. Isolator fluid 420 also fills the tube 410 in order to couple pressure from the isolator diaphragm 414 to the pressure sensor. Isolator fluid 420 is preferably silicone oil.

As an alternative to connecting a threaded pipe to the threaded process inlet 434, process fluid pressure can be applied by connecting the module housing 402 to a pressure flange (such as pressure flange 104 illustrated in FIGS. 1–3). In this preferred arrangement, the pressure flange applies process fluid to a planar process inlet 440. The planar process inlet 440 comprises a recess surrounding the threaded inlet 434. A gasket sealing surface 442 surrounds the planar process inlet 440. Four bolts are passed through the pressure flange and threaded into the four threaded bolt holes 434 to compress and seal a gasket in the gasket sealing surface 442.

Figure 8:
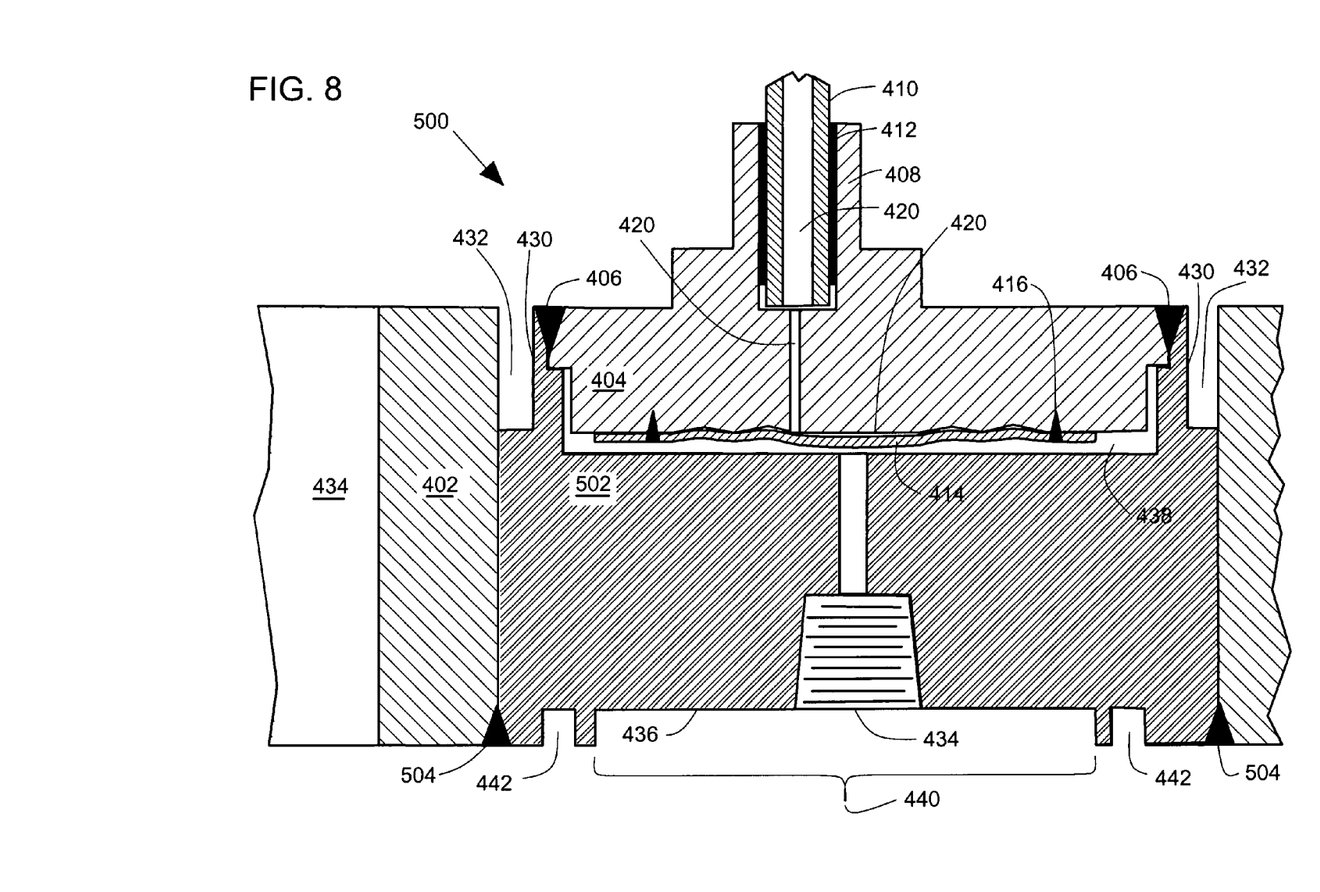
FIG. 8 illustrates an enlarged cross-sectional view of a second exemplary embodiment of a fluid isolator member and module housing.

FIG. 8 illustrates an enlarged cross-sectional view of a second embodiment of a fluid isolator member 500 in a module housing 402. Reference numbers used in FIG. 8 that are the same as reference numbers used in FIG. 7 identify the same or similar features.

In FIG. 8 the module housing 402 is adapted to receive a generally cylindrical insert 502 to which the support block 404 is joined at joint 504, which is preferably a weld joint. In such an arrangement, the insert 502 effectively becomes part of the module housing 402, but the insert 502 can be made of a different material than the housing 402. The arrangement shown in FIG. 8 allows a fluid isolator member to be inserted from the bottom surface of the module housing 402 as well as a top surface, which allows for manufacturing flexibility. Other arrangements of blocks and housing slots (not illustrated) can be used as well to allow for insertion of fluid isolator members from the sides of the module housing 402. The material of insert 502, support block 404 and isolator diaphragm 414 may differ from that of module housing 402 to provide an increased level of corrosion resistance. Optional materials include industry standard nickel based alloys such as Hastelloy™ and Monel™. The use of fluid isolator members 500 allows for flexible, modular manufacturing. An inventory of fluid isolator members 500 can be maintained in useful combinations of selected process wetted materials (such as stainless steel, Hastelloy or Monel) and selected pipe threads (such as ⅛" NPT and ¼" NPT and metric sizes). When a customer orders a pressure transmitter, the transmitter can be quickly assembled to the customer's specification by selecting fluid isolator members with the desired process wetted materials and pipe threads from an inventory or previously completed fluid isolator members. Joint 504 can be placed adjacent an external surface as illustrated, or can alternatively be placed adjacent another surface, depending on the needs of the application.

Figure 9:
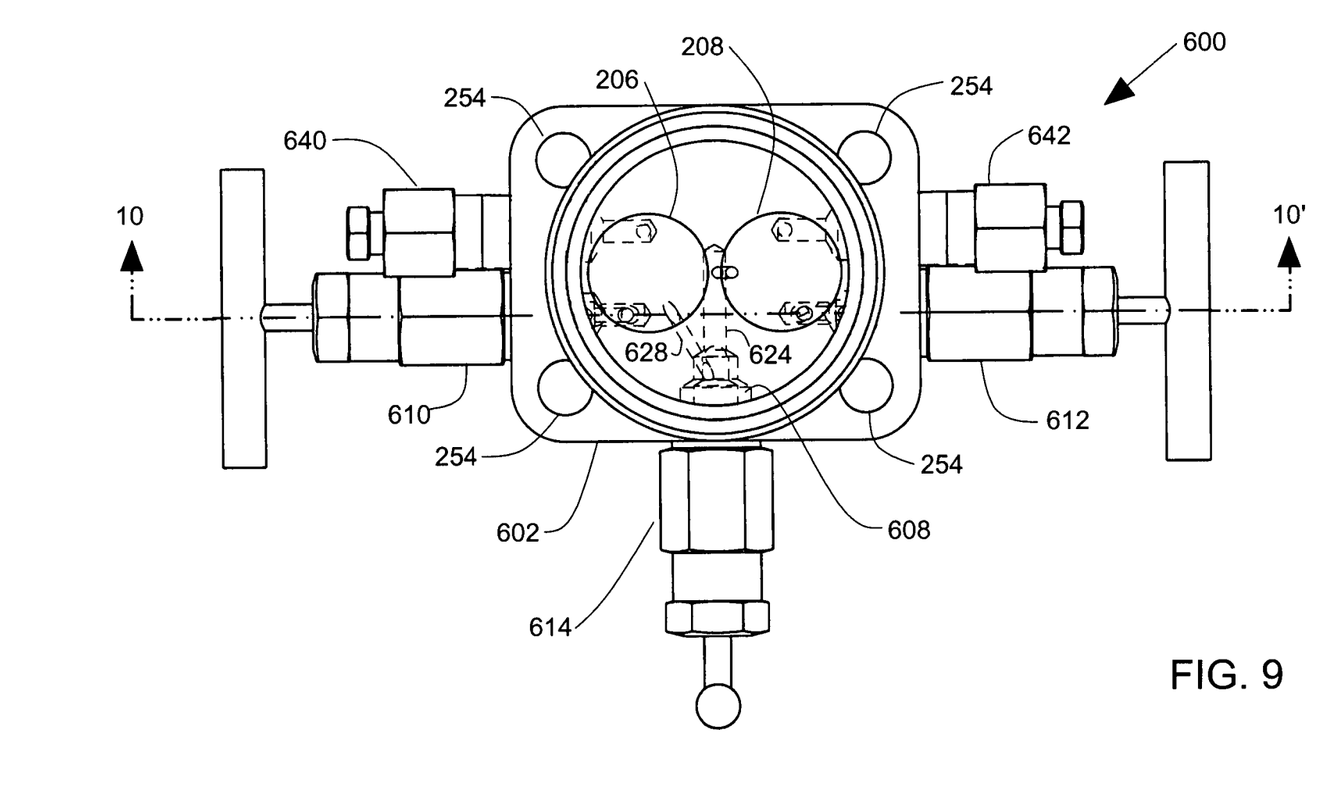
FIG. 9 illustrates a top view of a third embodiment of a pressure module.
Figure 10:
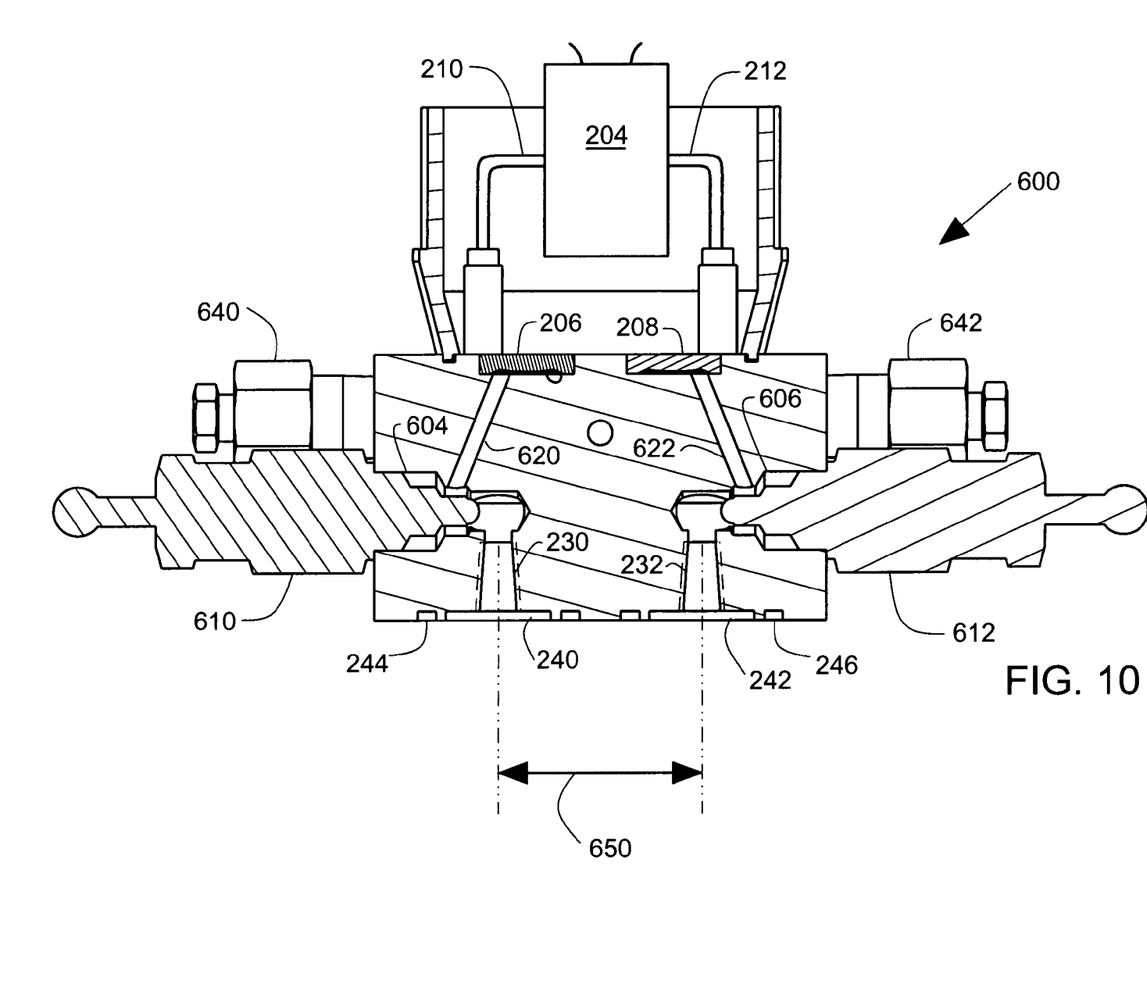
FIG. 10 illustrates a cross-sectional view of the pressure module generally along line 10—10' in FIG. 9.
Figure 11:
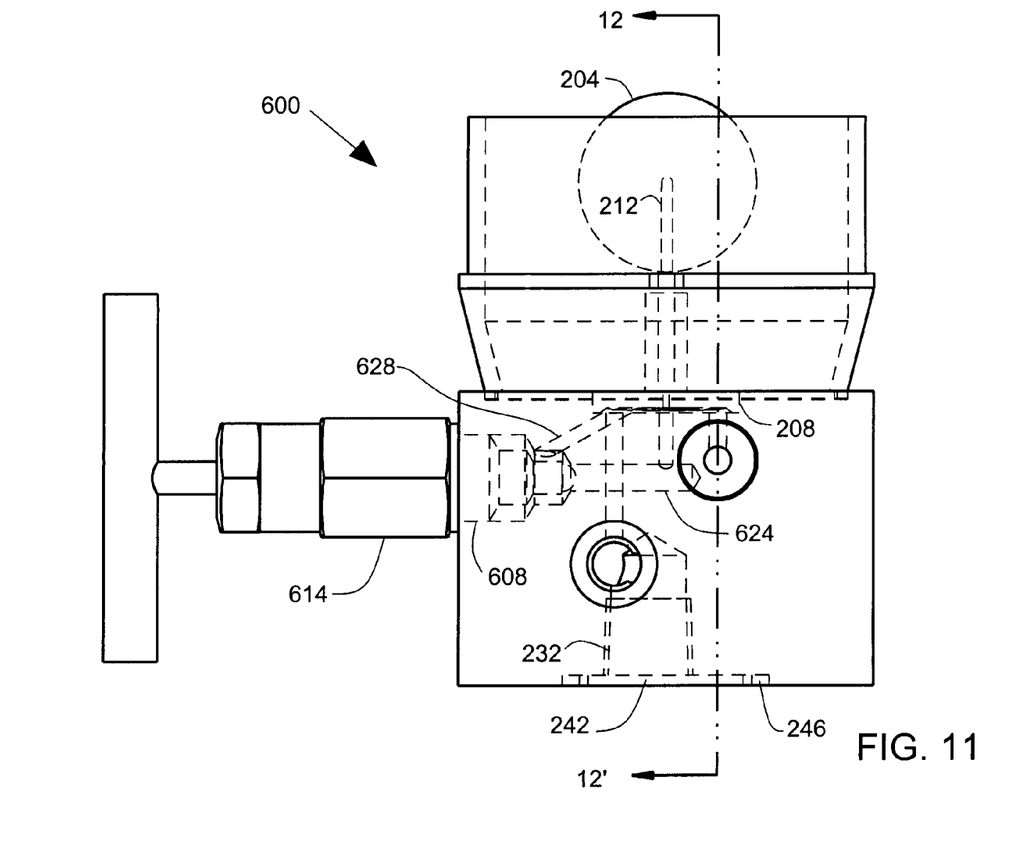
FIG. 11 illustrates a right side view of the pressure module shown in FIG. 9.
Figure 12:
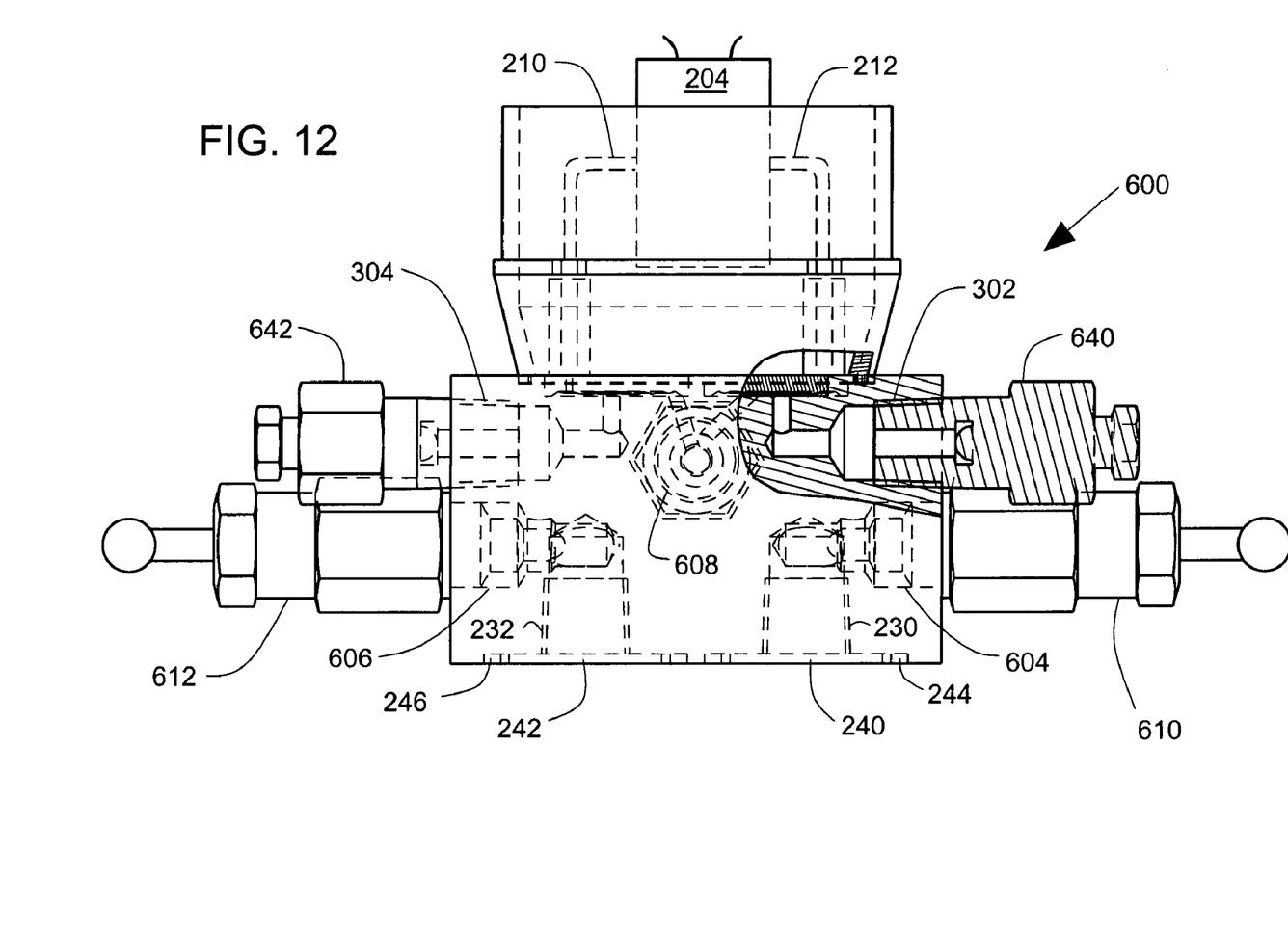
FIG. 12 illustrates a cross-sectional view of the pressure module shown in FIG. 9, generally along line 12—12' in FIG. 11.
Figure 13:
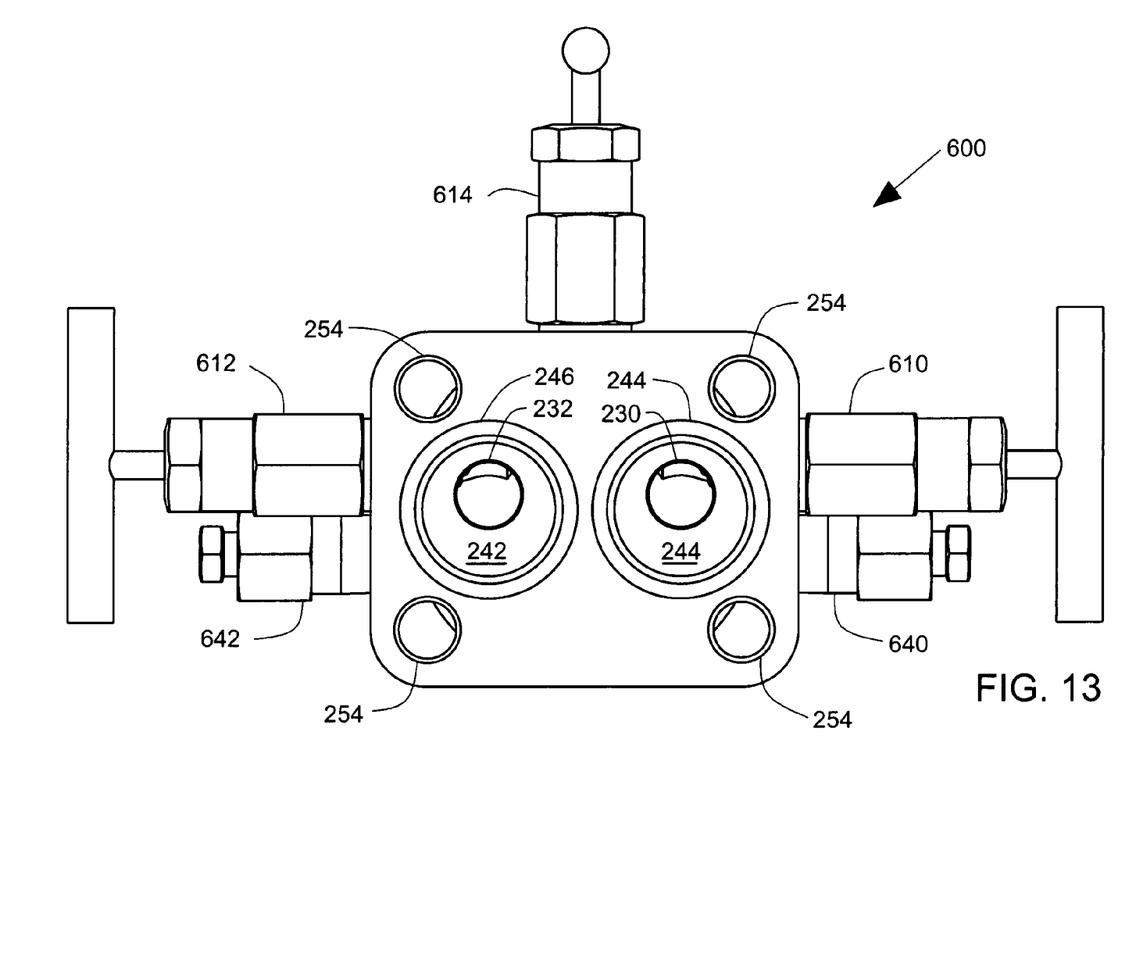
FIG. 13 illustrates a bottom view of the pressure module shown in FIG. 9.

FIGS. 9–13 illustrate various view of an embodiment of a pressure module 600. Pressure module 600 is similar to pressure module 300 illustrated in FIG. 6. Reference numbers used in FIGS. 9–13 that are the same as reference numbers used in FIG. 6 identify the same or similar features. FIG. 9 illustrates a top view of the pressure module 600 with a sensor 204 and its connecting tubes 210, 212 omitted for clarity. FIG. 10 illustrates a cross-sectional view of the pressure module 600 generally along line 10— 10' in FIG. 9. FIG. 11 illustrates a right side view of the pressure module 600. FIG. 12 illustrates a cross-sectional view of pressure module 600 generally along line 12—12' in FIG. 11. FIG. 13 illustrates a bottom view of the pressure sensor module 600.

Pressure module 600 includes a module housing 602 that is adapted to include threaded valve inlets 604, 606 (illustrated in FIGS. 10, 12) and threaded valve inlet 608 (illustrated in FIGS. 9, 11, 12). Valves 610, 612, 614 are threaded into the threaded valve inlets 604, 606, 608. The valves 610, 612, 614 are of conventional design and can be manually actuated to an open or closed position to control transmission of pressure through a process passageway in the module housing 602. As best seen in FIG. 10, the shutoff valve 610 controls transmission of pressure through a process passageway 620 that couples process fluid between threaded inlet 230 and fluid isolator member 206. As best seen in FIG. 10, the shutoff valve 612 controls transmission of pressure through a process passageway 622 that couples process fluid between threaded inlet 232 and fluid isolator member 208. As best seen in FIGS. 9 and 11, the equalize valve 614 controls transmission of pressure through process passageways 624, 628 that couple process fluid between fluid isolator member 206 and fluid isolator member 208. The valves 610, 612, 614 can be used in conjunction with drain/vent valves 640, 642 to select pressures to apply to the pressure module 600 for in-situ calibration. Tapered threads and sealants are preferably used to ensure reliable sealing.

In other respects, the pressure module 600 is similar to the pressure module 300 illustrated in FIG. 6. A spacing 650 (FIG. 10) between the centerlines of the threaded inlets 230, 232, and the particular pipe size of the threaded inlets 230, 232 can be selected to match various standard sizes and spacings used in the process control industry.

Although the present invention has been described with reference to preferred embodiments, workers skilled in the art will recognize that changes may be made in form and detail without departing from the scope of the invention.

What is claimed is:

1. A pressure module, comprising:
   a sensor assembly including a pressure sensor, fluid isolator members and tubes extending from the pressure sensor to the fluid isolator members;
   a module housing forming a cavity in which the pressure sensor is contained, the module housing including support members joined by joints to the fluid isolator members to provide barriers to leakage of process fluids into the cavity; and
   threaded process inlets arranged on a bottom outside surface of the module housing, the threaded process inlets coupling the process fluids to the fluid isolator members through process passageways in the module housing.

2. The pressure module of claim 1 wherein the joints comprise weld joints.

3. The pressure module of claim 2 wherein the weld joints comprise soft solder joints.

4. The pressure module of claim 2 wherein the weld joints comprise laser weld joints.

5. The pressure module of claim 2 wherein the weld joints comprise braze joints.

6. The pressure module of claim 1, further comprising:
   planar process inlets, each planar process inlet including a recess surrounding one of the threaded process inlets and a gasket sealing surface surrounding each of the recesses.

7. The pressure module of claim 6 wherein the module housing further comprises an arrangement of threaded mounting holes surrounding the gasket sealing surfaces.

8. The pressure module of claim 7 wherein the support members are formed as isolated support rims to provide mechanical stress isolation between the mounting holes and the fluid isolator members.

9. The pressure module of claim 1 wherein the module housing includes sockets that include the support members and that contain the process fluids.

10. The pressure module of claim 9 further comprising:
    threaded drain/vent inlets on outside surfaces of the module housing, each threaded drain/vent inlets coupling by a drain/vent passageway to one of the sockets.

11. The pressure module of claim 10 wherein the drain/vent passageways comprise bores in the module housing.

12. The pressure module of claim 1 wherein each of the fluid isolator members comprises:
    an isolator support block joined by one of the joints to one of the support members, the isolator support block including a support block inlet coupled to one of the tubes;
    an isolator diaphragm joined by a peripheral weld joint to the isolator support block; and
    isolator fluid filling a space between the isolator diaphragm and the isolator support block.

13. The pressure module of claim 12 wherein each isolator support block further comprises an isolator fluid passageway coupling isolator fluid from the support block inlet to the space.

14. The pressure module of claim 12 wherein the module housing includes generally cylindrical inserts to which the isolator support blocks are joined at the joints.

15. The pressure module of claim 1 wherein the bottom outside surface includes a sealing surface with four bolt holes.

16. A pressure module, comprising:
    a sensor assembly including a pressure sensor, fluid isolator members and tubes extending from the pressure sensor to the fluid isolator members;
    a module housing forming a cavity in which the pressure sensor is contained, the module housing including support members joined by joints to the fluid isolator members to provide barriers to leakage of process fluid into the cavity;
    threaded process inlets arranged on a bottom outside surface of the module housing, the threaded process inlets coupling process fluids to the fluid isolator members through process passageways in the module housing;
    shutoff valves mounted on the module housing, each of the shutoff valves controlling process fluid flow between one of the threaded process inlets and one of the isolator members; and
    coupling that allows process fluid flow between the fluid isolator capsules.

17. The pressure module of claim 16, wherein the coupling comprises:
    an equalizing valve mounted on the module housing controlling process fluid flow between the fluid isolator members.

18. The pressure module of claim 16 wherein the joints comprise weld joints.

19. The pressure module of claim 16, further comprising:
    planar process inlets, each planar process inlet including a recess surrounding one of the threaded process inlets and a gasket sealing surface surrounding each of the recesses.

20. The pressure module of claim 18 wherein the joints are selected from the group of solder joints, laser weld joints and braze joints.

21. The pressure module of claim 18 wherein the module housing includes sockets that include the support members and contain the process fluids.

22. The pressure module of claim 21 further comprising threaded drain/vent inlets on outside surfaces of the module housing, each threaded drain/vent inlets coupling by a drain/vent passageway to one of the sockets.

23. The pressure module of claim 22 wherein the drain/vent passageways comprise bores in the module housing.

24. The pressure module of claim 19 wherein the support members are formed as isolated support rims to provide mechanical stress isolation between the mounting holes and the fluid isolator members.

25. The pressure module of claim 16 wherein each of the fluid isolator members comprises:
    an isolator support block joined by one of the joints to one of the support members, the isolator support block including a support block inlet coupled to one of the tubes;

an isolator diaphragm joined by a peripheral weld joint to the isolator support block; and isolator fluid filling a space between the isolator diaphragm and the isolator support block.

26. The pressure module of claim 25 wherein each isolator support block further comprises an isolator fluid passageway coupling isolator fluid from the support block inlet to the space.

27. The pressure module of claim 25 wherein the module housing includes a generally cylindrical insert to which the isolator support blocks are joined at the joints.

28. The pressure module of claim 17 wherein the bottom outside surface includes a sealing surface with four bolt holes.

* * * * *